United States Patent [19]

Yang

[11] Patent Number: 4,709,917

[45] Date of Patent: Dec. 1, 1987

[54] MOCK BICYCLE FOR EXERCISE AND TRAINING EFFECTS

[76] Inventor: Tai-her Yang, 5-1, Tai-Pin Street, Kuang-Hwa Li, Si-Hu Jenn, Chang-Hwa Hsien, Taiwan

[21] Appl. No.: 726,961

[22] Filed: Apr. 29, 1985

Related U.S. Application Data

[63] Continuation of Ser. No. 414,876, Sep. 3, 1982, abandoned.

[51] Int. Cl.⁴ .............................................. A63B 21/00
[52] U.S. Cl. ..................................... 272/73; 272/132; 272/DIG. 5; 272/DIG. 6; 272/129; 273/DIG. 28; 434/61
[58] Field of Search ...................... 434/61, 35, 43, 45, 434/253; 273/1 E, 85 G, 86 R, 138 A, DIG. 28; 272/73, 97, 129, DIG. 4–6; 73/379; 324/166; 280/289 R, 200

[56] References Cited

U.S. PATENT DOCUMENTS

| | | |
|---|---|---|
| 1,219,789 | 3/1917 | Prettyman . |
| 1,909,002 | 12/1930 | Oehlberg . |
| 2,277,897 | 9/1941 | Alexander . |
| 2,474,370 | 6/1949 | Russell . |
| 2,735,422 | 2/1956 | Jones . |
| 3,159,400 | 12/1961 | Brass et al. ............................ 272/97 |
| 3,210,634 | 10/1965 | Stern . |
| 3,240,947 | 7/1962 | Mas ...................................... 272/73 |
| 3,727,913 | 4/1973 | Glaser et al. . |
| 3,831,172 | 8/1974 | Olliges et al. .................... 273/85 G |
| 3,869,121 | 3/1975 | Flavell . |
| 3,991,749 | 11/1976 | Zent . |
| 4,069,451 | 1/1979 | Rouse . |
| 4,093,232 | 6/1978 | Nutting et al. . |
| 4,140,959 | 2/1979 | Powell . |
| 4,141,630 | 2/1979 | Emmons ............................... 272/73 |
| 4,180,745 | 12/1979 | Bartlett et al. . |
| 4,196,528 | 4/1980 | Foerst ................................... 434/61 |
| 4,278,095 | 7/1981 | Lapeyre ...................... 273/DIG. 28 |
| 4,291,872 | 9/1981 | Brilando et al. ...................... 272/73 |
| 4,298,893 | 11/1981 | Holmes ................................. 272/73 |
| 4,358,105 | 11/1982 | Sweeney, Jr. ......................... 272/73 |
| 4,362,950 | 12/1982 | Turner . |
| 4,423,863 | 1/1984 | Figueroa .............................. 272/73 |
| 4,443,008 | 4/1984 | Shimano .............................. 434/61 |

OTHER PUBLICATIONS

"Playmeter", 4/15/80, vol. 6, #7, p. 25.

Primary Examiner—Richard C. Pinkham
Assistant Examiner—MaryAnn Stoll Lastova
Attorney, Agent, or Firm—Cushman, Darby & Cushman

[57] ABSTRACT

An exercise device is furnished with an electronic display or a mechanical belt for simulating road conditions. In an embodiment utilizing an electronic display, sensors are used to sense pedaling speed, rotational direction, and displacement of the handlebars. A brake handle producing a signal when actuated is also provided. The signals produced by the sensors are processed by a microprocessor for controlling the lateral position of the exercise bicycle with respect to the scene being displayed and the running speed of the road condition simulation. The microprocessor includes a memory which stores a program for controlling the pedaling resistance of the exercise device. In another embodiment, a belt provided with flat patterns on its surface depicting mock road conditions rotates. The user may control the position of a mock vehicle resting on the belt surface by manipulating the handlebars. The mock vehicle is coupled to the handlebar stem by a right-angle-shaped rod. Pedaling resistance is provided by coupling a multi-pole A.C. induction motor to the pedals.

2 Claims, 10 Drawing Figures

MOCK BICYCLE FOR EXERCISE AND TRAINING EFFECTS

This is a continuation of application Ser. No. 414,876, filed Sept. 3, 1982, which was abandoned upon the filing hereof.

BACKGROUND OF THE INVENTION

Generally, conventional exercise bicycles are operated by pedalling an adjustable resistance wheel so as to exercise the leg and feet muscles. In such conventional exercise bicycles, the pedalling resistance is adjusted manually. However, conventional exercise bicycles provide only an indoor exercise. The user can only pedal mechanically without feeling any road condition variation and acquiring any experience in handling such road conditions. In other words, exercising on a conventional exercise bike lacks interest, and may limit the user's will due to monotonous motion, thus preventing development of the user's physical strength. As a result, the exercise results may be lower than expected.

SUMMARY OF THE INVENTION

In view of the above disadvantages of the conventional exercise bicycle, the inventor has developed a dual-use mock bicycle for exercise and training. In accordance with the present invention, a user may actively exercise, or may passively exercise on mock road conditions in order to increase the exercise results. The present invention is particularly suited to training children and other beginning bicyclists by providing them with mock road conditions for training their riding abilities in preparation for real roads.

An apparatus in accordance with the present invention provides several exercising modes. The user may pedal a wheel which can automatically vary or mechanically adjust its resistance. The user may pedal a multi-pole A.C. induction motor so as to generate over-synchronous feedback for obtaining pedalling resistance and for obtaining an active exercise result. Finally, the user may place his feet on the pedals while they are being driven by a multi-pole A.C. induction motor in order to obtain a passive driving result.

An electronic or mechanical mock road condition simulator is provided in front of the handlebars of an exercise bicycle in accordance with the present invention. In the presently preferred embodiment in accordance with the present invention using an electronic (or fluorescent screen) mock road condition simulator, a microprocessor and three sensors (a pedalling speed sensor, a handlebar steering displacement sensor and a brake operation sensor) are provided. All of the signals coming from the sensors are analyzed and processed by the microprocessor in order to require the user to make an appropriate response in accordance with the mock road conditions, to control the running speed of the fluorescent screen background (i.e. the mock road surface), to control the lateral position of the mock driving vehicle on the fluorescent screen, or to stop the running of the fluorescent screen background. The microprocess may, in accordance with a predetermined mock road condition program, produce output signals to the mock road condition simulator and to the resistance adjusting device of the wheel so as to respectively vary the degree of incline of the mock road surface displayed by the fluorescent screen and to vary the pedalling resistance.

A running belt is installed in front of the handlebars of a second presently preferred embodiment of an exercise bicycle in accordance with the present invention. The surface of the running belt is furnished with flat mock road conditions. In addition, a mock driving vehicle is provided over the belt from the handlebar stem. By manipulating the handlebars, the mock driving vehicle may pretendedly laterally evade oncoming cars and obstructions on the mock road. The pedalling resistance is provided by pedalling a multi-pole A.C. induction motor for furnishing an over-synchronous feedback to the power source.

DETAILED DESCRIPTION OF THE PREFERRED EMBODIMENT

An apparatus in accordance with the present invention is a mock exercise bicycle for exercise and training. An exercise bike in accordance with the present invention is particularly suited for enabling children or beginning bicyclists to train themselves. Additionally, an exercise bike in accordance with the present invention may be used by average people as an exercise device for improving their health. In accordance with the present invention, a mock road condition display simulator is provided in front of the handlebars. In one embodiment, the mock road condition display simulator includes a CRT, LCD or LED mock road condition display. In another embodiment, the mock road condition display simulator includes a mechanical transmission structure. The simulated mock road conditions provided by the mock road condition display simulator may include straight roads, curved roads, uphill/downhill roads, rough roads, roads having two-way traffic, etcetera. The user may manipulate a set of handlebars to any direction. The position of the mock driving vehicle displayed on the mock road condition display simulator is changed accordingly. The running speed of the displayed mock road conditions may be varied by varying the pedalling speed, thus changing the relative speed between the mock driving vehicle and the mock road surface.

A sensor to measure the left/right displacement of the handlebars of the first embodiment of an exercise bicycle in accordance with the present invention is provided between the two handlebars of the bicycle. A rotational speed sensor is provided on the driven wheel of the exercise bicycle. Signals produced by these two sensors are coupled to a microprocessor. After processing the input from the two sensors, the microprocessor will, in accordance with the user's manipulation of the handlebars and the pedals, produce output signals to the display simulator to change the mock road conditions being displayed. As the user turns the handlebars, the microprocessor will change the lateral position of the mock driving vehicle with respect to the scene being displayed. A microprocessor may also compare the output signal of the rotation speed sensor with a reference level in order to generate differential signals to the display simulator for varying the moving speed of the mock road conditions being displayed.

The microprocessor described above includes a memory or other storage means in which a program for varying the mock road conditions is stored. When this program is read and executed, the microprocessor will, in accordance with the signals produced by the sensors, apply a series of signals to the display simulator in order to vary the degree of incline of the mock road surface. Simultaneously, the microprocessor will apply signals to a resistance adjusting device coupled to the driven wheel of the exercise bicycle in order to vary the pedalling resistance in a given sequence in order to simulate real road conditions to increase the training effects of the exercise bicycle.

The resistance adjusting device may include a motor and its associated driving device. Alternatively, the resistance adjusting device may include a solenoid (and its associated driving device) which controls a resistance adjusting wheel (of a much smaller size than the driven wheel of the exercise bicycle) coupled to the top of the driven wheel for varying the friction between the two wheels, thus adjusting the pedalling resistance.

In addition to pedalling the servo-controlled resistance wheel mentioned above, an idling multi-pole A.C. induction motor may be pedalled to provide a power source with an over-synchronous feedback. Alternatively, a multi-pole A.C. induction motor (provided with power from a power source) may drive the pedals to rotate, thus causing the user's feet to follow the rotation of the pedals. Alternatively, a D.C. or A.C. generator may be coupled to the pedals to provide power generated feedback (either directly or through a rectifier) to a storage battery to provide D.C. power for other electrical devices provided on the exercise bicycle.

Figure 1:
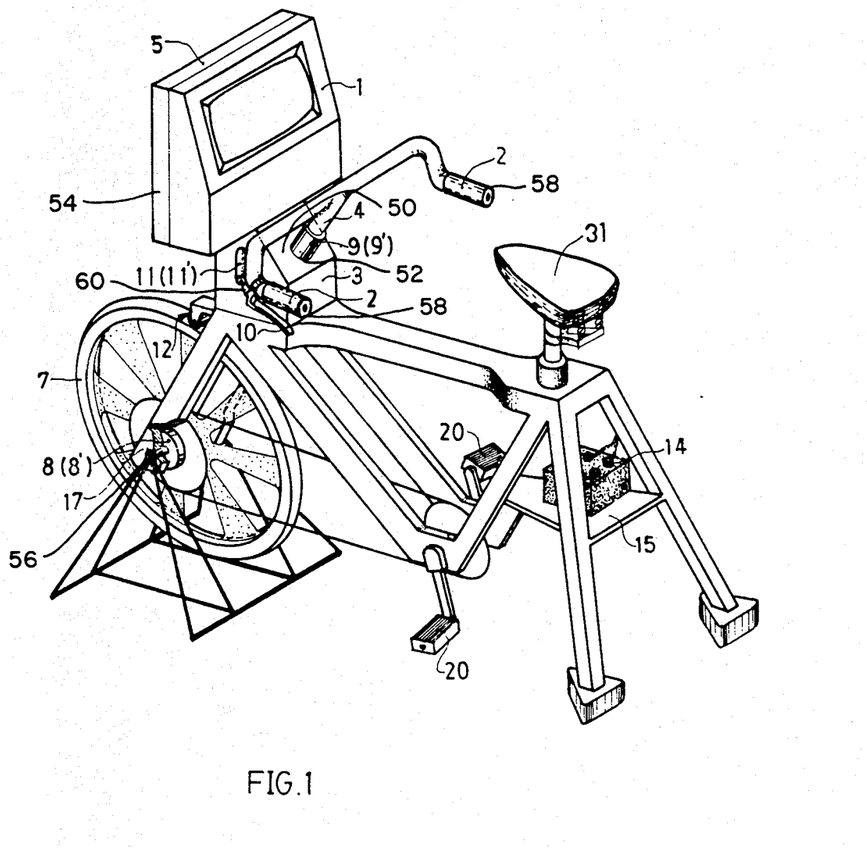
FIG. 1 is a side elevational view of a first embodiment of an exercise bicycle in accordance with the present invention in which an electronic display device is used as a mock road condition simulator and the pedalling resistance of the exercise bicycle is automatically varied by a microprocessor.

Referring now more particularly to FIG. 1, a first presently preferred embodiment in accordance with the present invention is shown. A display (simulator) 1 is installed on a headstock 3 of handlebars 2. Display 1 is installed in front of handlebars 2. An oblique surface 50 of headstock 3 defines a round hole 52 through which a handlebar stem 4 penetrates. Handlebars 2 may be rotated by a user, but are not coupled to a driven wheel 7. A flat case 5 is provided on a back surface 54 of display 1. A microprocessor 6 (not shown) and its associated memory 61 (not shown) which stores the mock road condition program are housed within flat case 5.

A pedalling speed sensor 8 (8') is provided on a hub 56 of driven wheel 7. Pedalling speed sensor 8 may be a photoelectric or electromagnetic rotational sensor (for example, a conventional photoelectric pulse generator). Pedalling speed sensor 8 is installed to generate and deliver digital or analog signals proportional to the angular velocity of driven wheel 7 (and thus proportional to the pedalling speed).

A handlebar displacement sensor 9 (9') is provided between handlebar stem 4 and headstock 3 for measuring the steering direction and displacement of the handlebar stem. Handlebar displacement sensor 9 may be a photoelectric, electromagnetic or potentiometer sensor. Handlebar displacement sensor 9 produces a signal level (or output pulse number) proportional to the rotary displacement of handlebar stem 4.

A brake handle 10 is provided adjacent to one of two handlebar grips 58 which are mounted on handlebar 2. Brake handle 10 is coupled through a brake cable 60 to a brake operation sensor 11 (11'). When brake handle 10 is depressed, brake operation sensor 11 delivers an output signal.

Figure 2:
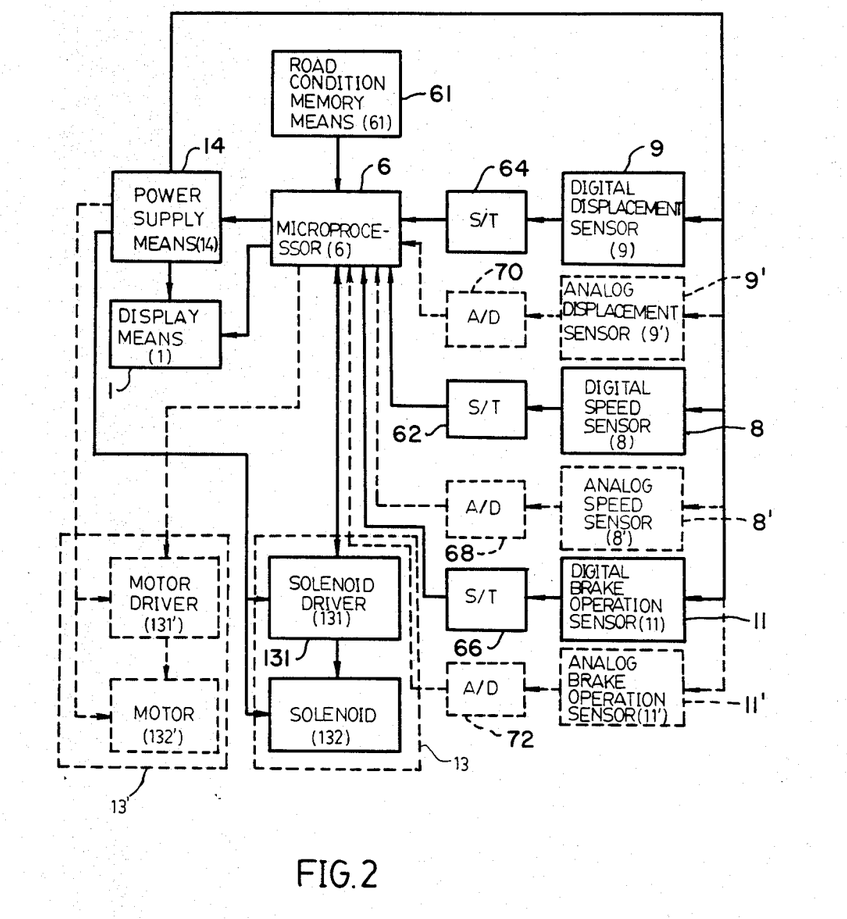
FIG. 2 is a block diagram of the circuitry of the embodiment shown in FIG. 1.

Referring now more particularly to FIGS. 1 and 2, pedalling speed sensor 8, handlebar displacement sensor 9 and brake operation sensor 11 produce signals which are applied to microprocessor 6. Pedalling speed sensor 8, handlebar displacement sensor 9 and brake operation sensor 11 deliver their outputs to Schmitt triggers 62, 64 and 66, respectively, if they produce digital outputs. Schmitt triggers 62, 64 and 66 produce outputs to microprocessor 6. Schmitt triggers 62, 64 and 66 convert the voltage level of a signal from a slowly changing waveform into a signal having a quickly changing waveform. Alternatively, if pedalling speed sensor 8', handlebar displacement 9' and brake operation sensor 11' produce analog outputs, they are coupled to microprocessor 6 through analog-to-digital (A/D) converters 68, 70 and 72, respectively.

Microprocessor 6 generates several outputs. One output of microprocessor 6 is applied to a power supply device 14 (mounted on a bracket 15 at the rear of the exercise bicycle shown in FIG. 1). Microprocessor 6 also applies an output to display 1. Finally, microprocessor 6 applies an output to a driving control device 13, which is coupled to a resistance adjusting wheel 12. Resistance adjusting wheel 12 is coupled to driving wheel 7.

Display 1 may be set to display mock road conditions simulating two-way traffic. A user driving the exercise bicycle may avoid possible collision with an oncoming car displayed on display 1 by steering handlebars 2. Handlebar displacement sensor 9 will generate signals proportional to the left or right steering displacement of handlebars 2. Microprocessor 6 will immediately process signals produced by handlebar displacement sensor 9 and generate corresponding output signals to display 1 to change the lateral position of the exercise bicycle with respect to the scene displayed by the display so that oncoming vehicles are evaded.

To speed up the simulated progress of the exercise bicycle through the mock road conditions displayed by display 1, a user may increase the rate at which he rotates pedals 20. Pedalling speed sensor 8 will produce a signal proportional to the rate at which pedals 20 are rotated. Microprocessor 6 compares the signal produced by pedalling speed sensor 8 with a reference level, and produces a differential signal proportional to the comparison. This differential signal is applied to display 1 to speed up the running speed of the mock road surface scene displayed so as to increase the relative speed of the progression of the exercise bicycle through the scene.

If the mock road condition scene displayed by display 1 includes road blocks or other vehicles such that a collision cannot be avoided, the user may depress brake handle 10. Brake operation sensor 11 will, in response, generate an output signal which is applied to microprocessor 6. Microprocessor 6 will discontinue the execution of the road condition program stored in memory 61 to stop the running of the mock road surface simulation, thus simulating a braking effect. When handlebars 2 are steered by the user to drive around the obstructions displayed by display 1, the user may release brake handle 10. Upon the release of brake handle 10, the brake operation sensor 11 ceases to produce an output, and microprocessor 6 recommences displaying the progressing mock road condition scene.

Figure 3A:
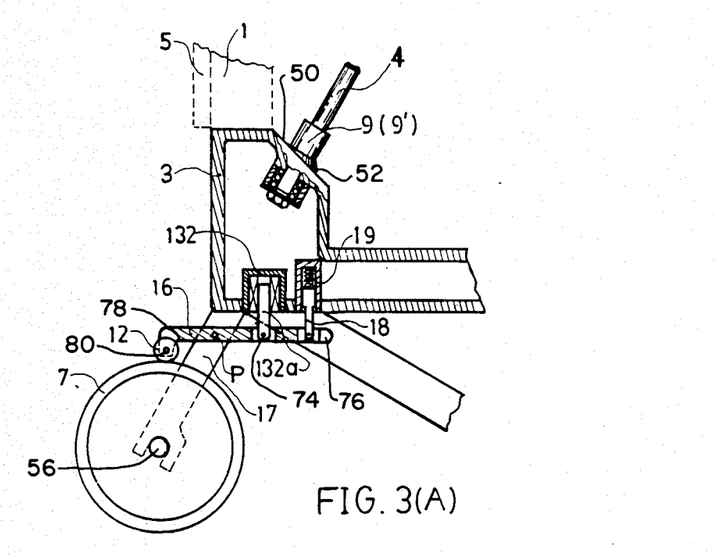
FIG. 3(a) is a side elevational view in section of a first embodiment of the resistance adjusting wheel in the driving control device of the embodiment shown in FIG. 1.

The pedalling resistance felt by the user is varied by the program stored in memory 61. As the program stored in memory 61 is applied to microprocessor 6, the microprocessor will almost simultaneously produce a series of signals to display 1 and to driving control device 13. In response, driving control device 13 varies the resistance which resistance adjusting wheel 12 offers to the rotation of driven wheel 7, thus changing the degree of inclination of the mock road surface displayed by display 1 and the pedalling resistance offered by pedals 20. Frequent increases and decreases of the pedalling resistance allows the user to test his will and endurance, thus increasing the exercise and training effect of the exercise bicycle. Referring now more particularly to FIGS. 1 and 3(a), driving control device 13 (not shown) controls a solenoid 132. Solenoid 132 includes a movable iron core 132a which is connected by an axle 74 to a lever 16. Lever 16 is also connected near one extremity 76 to a connecting rod 18. Finally, lever 16 is pivotably connected to fork 17 by a fulcrum axle P. Resistance adjusting wheel 12 is rotatably connected by an axle 80 to a second extremity 78 of lever 16.

When solenoid driver 131 receives from microprocessor 6 an appropriate control signal, the solenoid driver generates corresponding driving signals and applies them to solenoid 132. When driving signals are applied to solenoid 132, movable iron core 132a of the solenoid will move axially to cause lever 16 to pivot about fulcrum axle P. When solenoid 132 is energized, movable iron core 132a will be attracted upwards, pivoting lever 16 about fulcrum axle P to press resistance adjusting wheel 12 downwards to hand driven wheel 7. The resistance between resistance adjusting wheel 12 and driven wheel 7 increases in accordance with the amount of current applied to the solenoid. When solenoid 132 is de-energized, the movable iron core 132a will move axially downwards. A compressed spring 19 will apply a restoring force to connecting rod 18 to pivot lever 16 about fulcrum axle P, thus causing resistance adjusting wheel 12 to move upwards away from driven wheel 7. Thus, when solenoid 132 is de-energized, the pedalling resistance is at a minimum.

Another embodiment of a driving control device 13' includes a motor 132' (which may be a step motor, a D.C. motor, or an A.C. motor) and a motor driver 131'. A mechanical transmission may be used to convert the rotary movement of motor 132' into a linear movement for moving resistance adjusting wheel 12 up and down to automatically adjust the pedalling resistance.

Figure 3B:
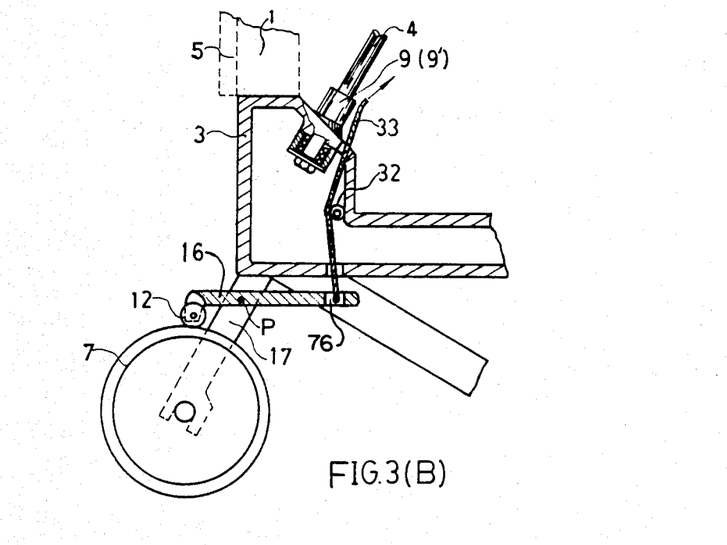
FIG. 3(b) is a side elevational view in section of a second embodiment of a resistance adjusting wheel controlled by a manual device.

Referring to FIG. 3(b), shown is another embodiment of a pedalling resistance adjustment device in accordance with the present invention wherein the pedalling resistance adjusting is performed manually instead of under microprocessor control. A pulley block 32 is provided inside of headstock 3. A steel cable 33 is connected at one end to extremity 76 of lever 16 and at the other end to a selection switch (not shown) installed on handlebars 2. Cable 33 passes through pulley block 32 and headstock 3. When the selection switch is manipulated by the user, cable 33 causes lever 16 to pivot about fulcrum axle P, thus adjusting the pedalling resistance.

The embodiments shown in FIGS. 1–3(b) may also be modified to include a D.C. or A.C. generator (not shown) coupled to the axle of pedals 20. Power generated by the generator may be stored in a storage battery (not shown) for providing power to other devices of the exercise bicycle which require it. Thus, such a generator may be used in place of the power supply 14 shown in FIGS. 1 and 2.

Figure 4A:
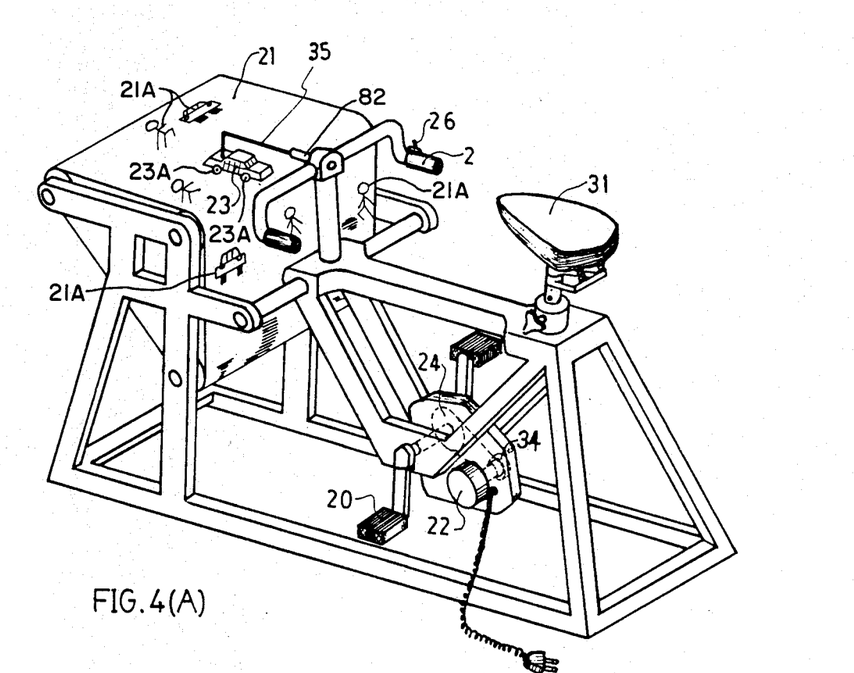
FIG. 4(a) is a side elevational view of a second presently preferred embodiment of an exercise bicycle in accordance with the present invention in which the mock road condition simulator is a running belt and the pedalling resistance is obtained by pedalling a multi-pole induction motor that provides over-synchronous feedback to the power source.

Referring to FIG. 4(a), a second presently preferred embodiment of an exercise bicycle is shown. The exercise bicycle is provided with a belt 21 on which some mock road condition patterns 21a are provided. Belt 21 is driven by a motor (not shown). Pedalling resistance to the rotation of pedals 20 may be obtained by a multipole (for example, 48 pole) A.C. induction motor 22 to provide an over-synchronous feedback to the power source of the motor.

A mock driving vehicle 23 is fixed to a right-angle-shaped rod 35, which in turn is fixed to a middle portion 82 of handlebars 2. The wheels 23a of mock driving vehicle 23 evenly rest on the surface of belt 21. The user may steer handlebars 2 to cause mock driving vehicle 23 to evade oncoming "obstructions" (such as pedestrians, oncoming vehicles or roadblocks), which are all flat mock road condition patterns 21a provided on belt 21.

Figure 4B:
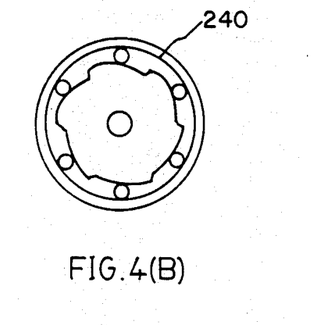
FIG. 4(b) is a detailed side elevational view of the one-way transmission mechanism of the embodiment shown in FIG. 4(a)

The driving force of pedals 20 is transmitted to multipole A.C. induction motor 22 through a one-way transmission mechanism 24 (instead of to the front wheel as shown in the embodiment of FIG. 1). One-way transmission mechanism 24 may comprise a ratchet wheel 240, as shown in FIG. 4(b). Due to the effect of one-way transmission mechanism 24, motor 22 may only be driven idly with power from the power source, but cannot drive pedals 20 to rotate. When pedals 20 are pedalled in the forward direction (i.e., the same direction of rotation as that of motor 22), the motor may, through one-way transmission mechanism 24 (which has a predetermined speed ratio), be driven to a speed higher than the synchronous speed $N_s = 120f/P$. Motor 22 will thereupon rotate in a reverse direction to generate power, which is fed back to the power source. The original torque will be converted into a retarding torque, which is then transmitted through one-way transmission mechanism 24 to pedals 20 to provide mechanical pedalling resistance for the user.

Referring now more particularly to FIG. 4(b), there is shown an illustration of a presently preferred embodiment of transmission mechanism 24 including a one-way ratchet wheel 240. The use of one-way ratchet wheel 240 would be appropriate if motor 22 were selected to be a multi-pole A.C. induction motor (as described above) which induces mechanical resistance by the generation of over-synchronous feedback.

Figure 4C:
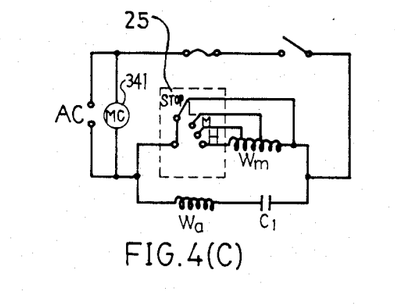
FIG. 4(c) is a schematic diagram of the electronic control circuitry of the embodiment shown in FIG. 4a)

Referring to FIG. 4(c), shown is a schematic diagram of the electronic motor circuitry of the embodiment shown in FIG. 4(a). Main winding $W_m$ of the stator of a single-phase A.C. induction motor 22 is connected to a tap-selection switch 25. Tap-selection switch 25 may be placed in one of four positions: a "high retarding torque" position H, a "middle retarding torque" position M, a "low retarding torque" position L, and "stop" position. An auxiliary winding $W_a$ of motor 22 is connected in series with a capacitor $C_1$. Capacitor $C_1$ serves as a phase-splitting capacitor for motor starting functions. Tap selection switch 25 may be connected to a handle switch 26 (located on handlebars 2) to permit the user to select the desired retarding torque.

In comparing the presently preferred embodiment in according with the present invention shown in FIG. 4(a) with the embodiment shown in FIG. 1, the main differences between the embodiments are that a mechanical type of mock road condition simulator replaces the electronic mock road condition simulator in the embodiment shown in FIG. 1, and a manual pedalling resistance adjusting device replaces the programmed pedalling resistance control device of the embodiment of FIG. 1.

Figure 5A:
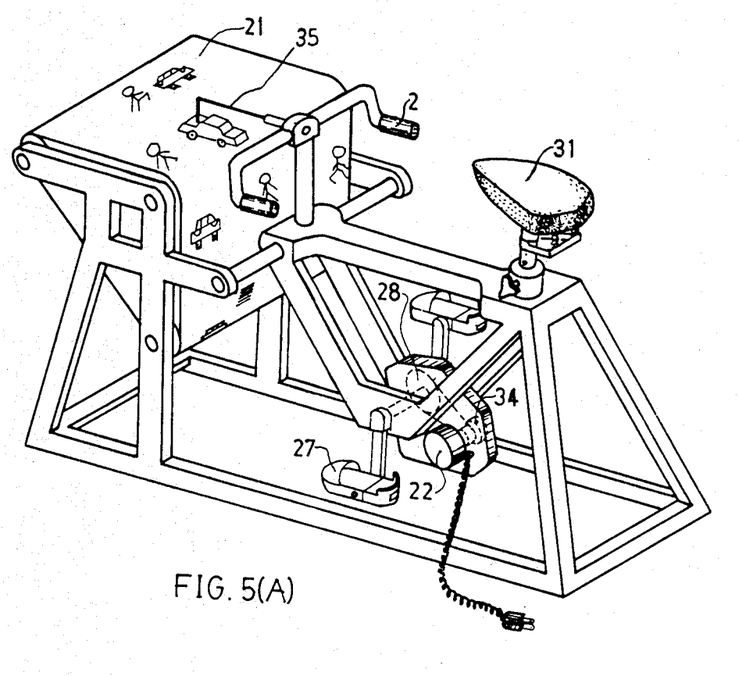
FIG. 5(a) is a side elevational view of a third presently preferred embodiment of an exercise bicycle in accordance with the present invention provided with a reversible transmission mechanism and a set of sliding-proof pedals.

Referring to FIG. 5(a), a third presently preferred embodiment in accordance with the present invention is shown. In the embodiment shown in FIG. 5(a), a set of sliding-proof pedals 27 and a reversible transmission mechanism 28 replace pedals 20 and one-way transmission mechanism 24, respectively, of the embodiment shown in FIG. 4(a). This embodiment permits the user not only to perform active pedalling to generate an over-synchronous feedback power (as previously described), but also permits passive exercising because pedals 27 may be driven to rotate.

Figure 5B:
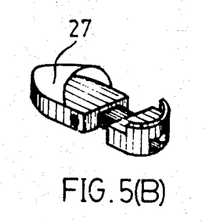
FIG. 5(b) is a detailed side elevational view of the sliding-proof pedals of the embodiment shown in FIG. 5(a)

Referring to FIG. 5(b), an embodiment of the sliding-proof pedals 27 shown in FIG. 5(a) is shown.

Figure 5C:
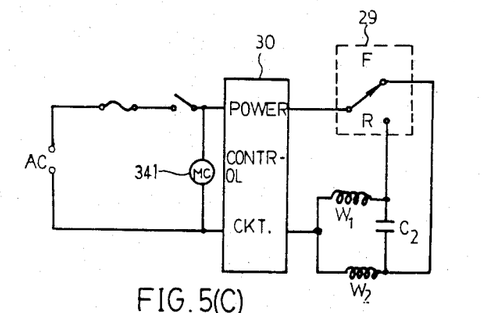
FIG. 5(c) is a schematic diagram of the electronic control circuitry of the embodiment shown in FIG. 5(a).

Referring to FIG. 5(c), a schematic diagram of the forward/reverse rotation control circuit of motor 22 used by the embodiment shown in FIG. 5(a) is shown. Two windings $W_1$ and $W_2$ of the stator of motor 22 have equal wire diameter and an equal number of turns. A control circuit 30 (which may be either a solid state or an electro-mechanical power control circuit) controls the input power of the multi-pole induction motor 22 in order to control the rotary speed of the motor and thus the rotational speed of sliding-proof pedals 27. Control circuit 30 may be used for controlling the amount of feedback power produced by the motor during over-synchronous generating, thus controlling the pedalling resistance felt by the user. A forward/reverse switch 29 selects which one of windings $W_1$ and $W_2$ is fed directly by the power source (and thus, which one of the windings is fed by the power source through a capacitor $C_2$).

A power cut-off brake device 34 is provided in the pedalling system in order to prevent the user seated on seat 31 from falling or being injured in the case that A.C. power supplied to the exercise bicycle is cut off suddenly. Brake means 34 will provide input resistance to motor 22 (such as in the case when the input power supply is cut-off suddenly) in order to protect the safety of the user whether he is exercising actively or passively.

Referring to FIGS. 4(c) and 5(c), a magnetic clutch MC represents a solenoid 341 of brake device 34.

An exercise bike in accordance with the present invention enables a user to learn how to manage driving under real road conditions by simulating road conditions. By using an exercise bicycle in accordance with the present invention, a beginner may be trained in preparation for real road conditions. An exercise bicycle in accordance with the present invention provides an automatic or manual selective pedalling resistance to be applied to the user's feet to increase the exercise and health effects obtained by its use. An exercise in accordance with the present invention provides two kinds of exercise, active pedalling and passive exercise, at the choice of the user.

What is claimed is:

1. An exercise apparatus comprising:
    a frame for supporting a user;
    first mechanical means, rotatably journaled to said frame, for being rotated by the feet of a user;
    velocity sensing means, coupled to said first mechanical means, for producing a first signal proportional to the angular velocity of the rotation of said first mechanical means;
    second mechanical means, rotatably journaled to said frame, for being manipulated between a first and a second position by the hands of the user;
    position sensing means, coupled to said second mechanical means, for producing a second signal indicative of the position of said second mechanical means;
    electronic simulation means, mounted to said frame and responsive to said first and second signals, for providing a changing visual scene simulating road conditions, said scene simulating inclines and declines in said simulated road conditions, the rate of change of said scene responsive to said first signal, the position of said scene with respect to said user responsive to said second signal;
    resistance control means, responsive to said simulated inclines and declines, for automatically applying a variable braking torque to said first mechanical means, wherein said resistance control means includes multi-pole A.C. synchronous induction motor means, mechanically coupled to said first mechanical means, for converting the rotational energy of said first mechanical means to electrical energy, said electrical energy being fed back to said motor means when said first mechanical means is rotated at an angular velocity exceeding the synchronous speed of said motor means, said motor means converting said fed back electrical energy to braking torque for braking said first mechanical means; and
    one-way transmission means for coupling braking torque produced by said motor means to said first mechanical means whenever said first mechanical means is rotated at an angular velocity exceeding the synchronous speed of said motor means, and for permitting said first mechanical means to freely rotate at a velocity less than the synchronous speed of said motor means.

2. An exercise bicycle of the type including a frame for supporting a user, said bicycle comprising:

first mechanical means, rotatably journaled to a frame, for being rotated by the feet of a user, said first mechanical means producing a first signal proportional to the angular velocity of said rotation;

second mechanical means, rotatably journaled to said frame, for being manipulated between a first and a second position by the hands of the user, said second mechanical means including sensor means for producing a second signal indicative of the position of said second mechanical means;

electronic simulation means, responsive to said first and second signals and viewable by the user, for providing a changing scene simulating road conditions, said scene simulating inclines and declines in said road conditions, the rate of change of said scene responsive to said first signal, the position of said scene with respect to said viewer responsive to said second signal;

resistance control means, responsive to said simulated inclines and declines, for automatically applying a variable braking torque to said first mechanical means, wherein said resistance control means includes multi-pole A.C. synchronous induction motor means, mechanically coupled to said first mechanial means, for converting the rotational energy of said first mechanical means to electrical energy, said electrical energy being fed back to said motor means when said first mechanical means is rotated at an angular velocity exceeding the synchronous speed of said motor means, said motor means converting said fed back electrical energy to braking torque for braking said first mechanical means; and power cut off brake means for applying braking friction to said first mechanical means when said power source ceases supplying power to said motor means.

* * * * *